United States Patent [19]
Reimelt

[11] Patent Number: 5,924,913
[45] Date of Patent: Jul. 20, 1999

[54] PROCESS FOR RENOVATING PIPES

[75] Inventor: Andreas Reimelt, Schwetzingen, Germany

[73] Assignee: GEVI, Mannheim, Germany

[21] Appl. No.: 08/793,557

[22] PCT Filed: Aug. 29, 1995

[86] PCT No.: PCT/DE95/01152

§ 371 Date: May 28, 1997

§ 102(e) Date: May 28, 1997

[87] PCT Pub. No.: WO96/06710

PCT Pub. Date: Mar. 7, 1996

[30] Foreign Application Priority Data

Aug. 29, 1994 [DE] Germany .............................. 44 30 334

[51] Int. Cl.$^6$ ...................................................... B24B 1/00
[52] U.S. Cl. ........................... 451/36; 29/402.18; 451/51; 451/53; 451/54; 451/61
[58] Field of Search ................................. 451/36, 51, 53, 451/54, 61; 29/81.02, 81.09, 81.021, 402.18; 15/56, 104.05, 104.061, 104.063; 118/55, 254, 317

[56] References Cited

U.S. PATENT DOCUMENTS

| | | | |
|---|---|---|---|
| 1,890,164 | 10/1932 | Rosenberger | 451/51 X |
| 2,087,694 | 7/1937 | Malmros | 451/51 X |
| 2,298,775 | 10/1942 | Raiche | 451/51 |
| 2,497,021 | 2/1950 | Sterns | 451/51 X |
| 2,745,231 | 5/1956 | Prince | 451/51 X |
| 3,082,073 | 3/1963 | McAnneny | 451/51 X |
| 3,139,704 | 7/1964 | McCune . | |
| 3,139,711 | 7/1964 | Soderberg, Jr. | 451/51 X |
| 3,286,406 | 11/1966 | Ashworth | 451/51 X |
| 3,485,671 | 12/1969 | Stephens . | |
| 3,608,249 | 9/1971 | Sullivan | 451/51 X |
| 3,835,587 | 9/1974 | Hall, Jr. | 451/51 X |
| 4,005,549 | 2/1977 | Perry | 451/51 X |
| 4,579,596 | 4/1986 | Murzyn . | |
| 5,046,289 | 9/1991 | Bengel et al. | 451/51 X |
| 5,460,563 | 10/1995 | McQueen, Jr. | 451/51 X |

FOREIGN PATENT DOCUMENTS

| | | |
|---|---|---|
| 0 299 134 | 1/1989 | European Pat. Off. . |
| 0 393 433 | 10/1990 | European Pat. Off. . |
| 0 551 790 | 7/1993 | European Pat. Off. . |
| 0 634 229 | 1/1995 | European Pat. Off. . |
| 0 637 737 | 2/1995 | European Pat. Off. . |
| 38 21 558 | 12/1989 | Germany . |
| 116040 | 2/1959 | U.S.S.R. ................................. 451/51 |
| 2 140 337 | 11/1984 | United Kingdom . |

OTHER PUBLICATIONS

Patent Abstracts of Japan, vol. 7, No. 102, Apr. 30, 1983, No. 58–22662.

*Primary Examiner*—Timothy V. Eley
*Attorney, Agent, or Firm*—Alston & Bird LLP

[57] ABSTRACT

A process for renovating pipes wherein a particulate abrasive material is passed through the pipe to loosen the internal deposits, and after the abrasive material and internal deposits are removed from the pipe, a coating of a curable resinous or plastic material is applied to the interior of the pipe. An alternately produced pressure drop between the two ends of the pipe is employed to cause the particulate abrasive material to reciprocate within the interior of the pipe and thereby effectively loosen the internal deposits and avoid cloggages resulting from the loosened and detached internal deposits.

28 Claims, No Drawings

PROCESS FOR RENOVATING PIPES

BACKGROUND OF THE INVENTION

The invention relates to a process for renovating pipes, which comprises the steps of removing internal deposits in the pipe by flowing abrasives and applying an inside coating of a viscous curing material.

Basically, it should be remarked at this point that the pipes to be renovated are already installed lines, which may carry gas, vapor, or liquid. Thus, the pipes may include, for example, feed and/or drain pipes for water or gas in residential, industrial, and municipal areas. This also includes residential and industrial sewer lines. All of these lines tend to form incrustations, which result primarily from calcareous deposits from the water, corrosion on the inside wall of the pipe, precipitates from the flow medium, products of reaction between the flow medium and entrained substances as well as the material of the pipe, etc., and from a combination of effects resulting therefrom. The foregoing phenomena lead to leaks or very considerable reductions of the inside cross sections of the pipes, whereby the transportation of the flow medium is disturbed, if not even prevented.

The presently claimed process for renovating pipes assists in avoiding a total replacement of the pipes, which turns out to be especially advantageous with respect to completely installed plumbing equipment. In this instance, the pipes are more or less freely accessible after removal of the fixtures, so as to permit application of the claimed cleaning and coating process. Essential is at any rate that a pipe be accessible at least at two open ends, so as to be able to carry out the individual steps of the process. The claimed process does not preclude an at least partial conventional repair of the pipes, so that it is also quite possible to replace complete pipe systems in part and to renovate same in part by the claimed process.

Processes of the aforesaid kind have been known from practice for quite some time. only as an example, reference is made in this context to EP 0 299 134. This European Patent discloses a process of this kind, in which the removal of internal deposits in the pipes and internal coating of the pipes occurs exclusively by means of compressed air. In other words, in the known process, compressed air is forced as a carrier medium through the pipe. When removing internal deposits, the transportation of the abrasive, which occurs exclusively by compressed air, leads to cloggages of the pipe, especially in the case of substantial internal deposits and, thus, requires quite considerable efforts to remove the cloggages. Flat parts that have been torn off by the compressed air are prone to accumulate just in the region of elbows or bends. Eventually, these accumulations will lead to a total blockage of the pipe.

Furthermore, the known method has the great disadvantage that while carrying out the process or during the application of compressed air, it is practically impossible to detect leaks. Consequently, there exists the risk that despite enormous leaks the inside wall is coated, which practically prevents a stopping of the leaks. In this respect, a large leak or hole in the pipe is virtually "improved" by the coating, and can no longer be effectively closed.

It is now the object of the present invention to describe a process for renovating pipes, which allows to obtain with simple technical means a conveying quality that is comparable with new piping, while avoiding cloggages by internal deposits which become detached during the treatment.

SUMMARY AND DETAILED DESCRIPTION OF THE INVENTION

The above and other objects and advantages of the present invention are achieved by the provision of a process for renovating pipes comprising the steps of introducing an abrasive material into the pipe by means of a pressure drop between the two ends of the pipe, then alternately producing a pressure drop between the two ends of the pipe so as to cause the abrasive material to reciprocate within the interior of the pipe, and then causing the abrasive material and any loosened internal deposits to exit from the pipe by means of a pressure drop between the two ends of the pipe. Finally, a coating may be applied to the interior of the pipe, which is subsequently cured.

In accordance with the invention, as soon as an adequate quantity of the abrasive is in the pipe, the abrasive effect is promoted in that the abrasive is caused to reciprocate in the pipe as a result of an alternating pressure drop. This feature of the present invention ensures that no cloggages develop inside the pipe as a result of detaching internal deposits. In particular, in the region of pipe elbows or bends, the pipes are effectively prevented from clogging. The advance of the abrasive as a result of an alternating pressure drop, i.e. the alternating motion of the abrasive inside the pipe continues until the pipe is totally freed from internal deposits, however at least until the abrasive is able to flow unhindered through the pipe. Once such a situation is reached, the further "cleaning process" can be accomplished even without an alternating pressure drop, simply by a predetermined pressure drop and the therefrom resulting advance of the abrasive through the pipe. In other words, the abrasive is finally caused to exit from the pipe as a result of a pressure drop between the two ends of the pipe. This may be a continuous operation, in which additional abrasive is sucked in by the pipe or blown thereinto at the inlet end.

Within the scope of a particularly advantageous generation of the pressure drop it will be of advantage, when the abrasive is caused to enter into the pipe from one end by a vacuum.

In this connection, it has been recognized that on the one hand the compressed air used in the state of the art may lead to damage of the pipe being renovated, or that is causes cloggages in the pipe. On the other hand, it will bring along considerable environmental stress, unless specific measures are taken, since the compressed air that is blown into the pipe under overpressure may exit, at the outlet end—under very high pressures—into the environment together with harmful substances. Accordingly, special collection and filter devices are required irrespective of, or aside from the compressed-air generation at the inlet end, which requires additional apparatus and, thus, involves also considerable costs. Other than for the vacuum generation, additional equipment is no longer needed as a result of the advantageous layout, inasmuch as suction occurs only at one end of the pipe, and the sucked-in air is collected or received, together with particles or the like, in an apparatus preceding the suction device. Added to this is the special advantage that, with a suction occurring on one side, the process can be carried out from one side of the pipe, namely from the suction side. It is only necessary to enter the viscous coating material at the free end, which may occur prior to the suction, so that again a single operator can start and carry out the actual coating operation at the suction end.

Furthermore, the advantageous layout of the process in accordance with the invention brings along the considerable advantage that the vacuum generated at the suction end drops toward the open end of the pipe. Consequently, as the distance from the outlet end or vacuum end decreases, detached particles are pulled along to a greater extent, so that as a result of the drop occurring in direction toward the outlet end, cloggages are effectively prevented, inasmuch as same are detached and entrained respectively to a greater extent with a decreasing distance from the outlet end. Finally, the process of the present invention facilitates detection of leaks, in that in the presence of a leak a lesser vacuum adjusts at the outlet end. When this drop of the vacuum occurs suddenly, same indicates a hole that has suddenly been torn open in the pipe.

Advantageously, the motion of the abrasives inside the pipes is generated in that the abrasive is caused to reciprocate in the pipe by alternating vacuum and overpressure. In other words, once it is accomplished that vacuum alternates with overpressure in the pipe, the abrasive is alternatingly sucked and blown therethrough. Likewise however, it is possible to cause the abrasive to reciprocate in the pipe by alternately applying a vacuum to both ends of the pipe. In this case, the above-described advantages are given. Finally, it is also possible to cause the abrasive to reciprocate in the pipe, in that overpressure is alternatingly applied to both ends of the pipe. In this instance, the overpressure is effectively used for advancing the abrasive only in the absence of substantial leaks in the pipe.

As regards a special, environment-protective realization of the process, it will be of advantage, when the preheated air that is used to dry the pipe is not simply sucked off, but rather sucked respectively out of, or through the pipe via a filter device. This filter device may directly precede the compressor, so that no special tools are needed.

The abrasive serving to remove the internal deposits could be particles of any kind that are carried by flowing air. However, these particles would have to be harder than the internal deposits that are to be removed. In this connection, particles having a grain size in the range from 0.3 mm to 6 mm have shown to be satisfactory, in particular in the renovation of water lines. A specific weight of more than 3.0 g/cm$^3$ has likewise been found advantageous. In this case, air is used as carrier medium. In the concrete case, the abrasive particles could be corundum or quartz sand. It would likewise be possible to provide the abrasive particles in the form of metallic particles, in particular ferromagnetic particles. These particles will permit a subsequent magnetic separation of the abrasive particles from the detached internal deposits, which consist, as aforesaid, of rust and/or lime.

The application of the coating material and, thus, on the one hand a satisfactory wetting with the inside wall of the pipe and, on the other hand, a rapid subsequent curing are favored in particular in that, after removal of the internal deposits, the pipe is heated to a temperature above room temperature. In this connection, a temperature of about 40° C. has shown to be especially satisfactory. The heating of the pipe could again occur by sucking therethrough heated air, which is sucked through the pipe until the desired temperature is reached at the outlet end. This temperature could again be determined via the temperature drop between the inlet end and the outlet end of the pipe. Anyhow, it is preferable that the heating of the pipe occur by sucking therethrough heated air and not by forcing therethrough compressed air. Finally, the preheated air serving to heat the pipe could also be sucked off via a filter device, which may likewise precede directly the compressor that is used for the suction.

Furthermore, in a very advantageous manner, the heating of the pipe could occur exclusively or additionally by means of a heating device which is sucked into the pipe after the cleaning and before applying the inside coating. In this respect, it would not be absolutely necessary that the heated air be sucked in, should the heating device that is sucked into the pipe have an adequate capacity. Just in the case of extremely long pipes, the heating device would at least be capable of preventing a cooling of the air that is sucked in at one end, so that the heating process is quite considerably accelerated. In a further advantageous manner, the heating device used to this end could be a heating wire, in particular a self-regulating heating wire. Such a heating wire could be constructed in the fashion of a resistance heater with a ceramic insulation of the heating conductor. However, in principle it is possible to use all devices that can be inserted or sucked into a pipe.

As regards an effective heating of the pipe, it will be of further advantage, when the heating wire extends through the pipe substantially over the entire length thereof. An even heating of the pipe is thus guaranteed.

With respect to inserting the heating wire, it will be especially advantageous, when same is sucked into the pipe by means of a tow system. The tow system could include a kind of parachute or the like, which is engaged by the air flow that develops as a result of the vacuum, and which pulls along the heating wire.

After the pipe is adequately heated, the heating wire is again pulled out of the pipe, advantageously before applying the inside coating. In so doing, the heating wire could be pulled out both from the inlet end and from the outlet end, i.e., from the vacuum side. In the latter case, it would be necessary to disconnect the power terminals at the inlet end.

Thereafter, the coating material is fed into the heated pipe. Also in this instance, a vacuum is generated at the outlet end. As a result of this vacuum, the coating material is sucked together with the ambient air into the pipe. In this process, the different viscosity between the air and the coating material causes the viscose coating material to come into contact with the pipe and to wet same. With the use of resin, synthetic resin, or plastic as coating material, the inside wall of the pipe receives a seamless coating. The pressure difference necessary to pull in the coating material is generated exclusively by the vacuum at the outlet end.

In the case of substantial leaks, the coating material may contain embedded fibers, in particular short-staple fibers, which may very advantageously be glass fibers. Due to the irregularly shaped openings, the glass fibers will come to lie crosswise or interlace thereat, and provide the viscous coating material with an adequate hold for stopping the leak. In this respect, it would be possible to close at least small holes and stop leaks.

Furthermore, in particular for preventing further environmental stress or necessary waste disposal, it would be very advantageous to measure the quantity of the coating material supplied to the free end of the pipe such that the inside wall of the pipe as a whole is entirely coated, however without substantial quantities of the coating material exiting from the pipe at the suction end. In other words, based on the normally resulting coating thickness and the length of the pipe being coated, it would be possible to predetermine the required quantity of coating material at least approximately, without having quantities of coating material exit at the suction end and without having to dispose of same.

Furthermore, the process of the present invention permits a temporary closing of the free end of the pipe, while suction occurs at one end. In this instance, the gradually developing vacuum will facilitate detection of possible leaks. When hardly any vacuum is obtained, the pipe system being renovated has a substantial leak.

Should it be desired to check, for example, the already cleaned pipe for its condition before the actual coating operation, or should it be desired to examine the quality of the coating after same is applied, it would likewise be possible to suck, to this end, into the pipe an optical means for inspecting the pipe or for a quality control of the inside coating. Likewise in this instance, it would be possible to use a tow system as an auxiliary means. In the simplest case, the optical means could be a fiber glass line capable of bringing light into the pipe on the one hand, and of bringing out from the pipe light beams that have been reflected therein. It is possible to provide for this purpose fiber bundles or different fiber lines with different functions. A very particular embodiment of optical means could comprise a kind of endoscope, i.e., a miniature camera that can be sucked into the pipe with a corresponding illumination, and even with a miniaturized, remote-control tool for taking samples, or the like.

Finally, it should be emphasized that the claimed process may comprise numerous, further advantageous process steps, without departing from the spirit of the invention as set forth in the appended claims.

I claim:

1. A process for renovating pipes comprising the steps of
   introducing an abrasive material into the interior of pipe by means of a pressure drop between two ends of the pipe,
   alternately producing a pressure drop between the two ends of the pipe so as to cause the introduced abrasive material to reciprocate within the interior of the pipe,
   causing the abrasive material and any loosened internal deposits to exit from the pipe by means of a pressure drop between the two ends of the pipe, and then applying a coating to the interior of the pipe.

2. The process as defined in claim 1 wherein the step of introducing an abrasive material into the interior of the pipe includes causing the abrasive material to enter into one end of the pipe by means of a vacuum.

3. The process as defined in claim 1 wherein the step of alternately producing a pressure drop between the two ends of the pipe includes alternately applying a vacuum and an overpressure to the interior of the pipe.

4. The process as defined in claim 1 wherein the step of alternately producing a pressure drop between the two ends of the pipe includes alternately applying a vacuum to both of the ends of the pipe.

5. The process as defined in claim 1 wherein the step of alternately producing a pressure drop between the two ends of the pipe includes alternately applying an overpressure to both of the ends of the pipe.

6. The process as defined in claim 1 wherein the step of applying a coating to the interior of the pipe includes sucking a coating material into one end and through the pipe.

7. The process as defined in claim 1 comprising the further step of drying the interior of the pipe prior to the step of causing the abrasive material to reciprocate within the interior of the pipe.

8. The process as defined in claim 7 wherein the step of drying the interior of the pipe includes causing heated air to flow through the pipe by applying a vacuum to one end of the pipe.

9. The process as defined in claim 8 wherein the step of causing heated air to flow through the pipe includes passing the heated air through a filter after the heated air passes through the pipe.

10. The process as defined in claim 1 wherein the abrasive material is particulate.

11. The process as defined in claim 10 wherein the particulate abrasive material has a grain size which averages in the range from 0.3 mm to 6 mm.

12. The process as defined in claim 11 wherein the particulate abrasive material has a specific weight greater than 3.0 g/cm$^3$.

13. The process as defined in claim 10 wherein the particulate abrasive material comprises corundum or quartz sand.

14. The process as defined in claim 10 wherein the particulate abrasive material comprises ferromagnetic particles.

15. The process as defined in claim 1 comprising the further step of heating the pipe to a temperature above ambient temperature after the step of causing the abrasive material and any loosened internal deposits to exit from the pipe.

16. The process as defined in claim 15 wherein the step of heating the pipe includes passing heated air therethrough and so as to heat the pipe to about 40° C.

17. The process as defined in claim 16 wherein the step of passing heated air through the pipe includes passing the heated air through a filter after the heated air passes through the pipe.

18. The process as defined in claim 15 wherein the step of heating the pipe includes passing a heating device through the pipe.

19. The process as defined in claim 18 wherein the step of passing a heating device through the pipe includes passing a heating wire through the pipe by means of a towing device.

20. The process as defined in claim 1 wherein the step of applying a coating to the interior of the pipe includes passing a coating material through the pipe with air.

21. The process as defined in claim 1 wherein the step of applying a coating to the interior of the pipe includes preheating the interior of the pipe, passing a viscous curable coating material through the interior of the pipe with air to wet the same and form an essentially seamless coating, and then causing the coating material to cure.

22. The process as defined in claim 21 wherein the coating material comprises a curable resin or plastic.

23. The process as defined in claim 21 wherein the coating material includes fibers.

24. The process as defined in claim 21 wherein the step of passing a viscous curable coating material through the pipe includes introducing a measured quantity of coating material into a free end of the pipe, while applying a suction to an opposite end of the pipe, and with the measured quantity being predetermined so as to coat the entirety of the inside wall of the pipe without having significant amounts of the coating material exiting from the opposite suction end of the pipe.

25. The process as defined in claim 21 comprising the further subsequent step of inspecting the coating of the coating material on the interior of the pipe and including passing an optical device through the pipe.

26. The process as defined in claim 25 wherein the optical device comprises a fiber glass line.

27. The process as defined in claim 25 wherein the optical device comprises an endoscope.

28. The process as defined in claim 1 comprising the further step of detecting for leaks in the pipe by drawing a vacuum at one end of the pipe while closing the opposite end and monitoring the vacuum level in the pipe.

* * * * *